J. V. WHITBECK.
MOUNTING FOR CONTROL BUTTONS.
APPLICATION FILED APR. 14, 1914.

1,299,644.

Patented Apr. 8, 1919.

WITNESSES
Geo. Schwartz.
S. A. Thornton.

INVENTOR
John V. Whitbeck
BY
ATTORNEYS

UNITED STATES PATENT OFFICE.

JOHN V. WHITBECK, OF CLEVELAND, OHIO, ASSIGNOR TO CHANDLER MOTOR CAR COMPANY, OF CLEVELAND, OHIO, A CORPORATION OF OHIO.

MOUNTING FOR CONTROL-BUTTONS.

1,299,644.

Specification of Letters Patent.

Patented Apr. 8, 1919.

Application filed April 14, 1914. Serial No. 831,720.

*To all whom it may concern:*

Be it known that I, JOHN V. WHITBECK, a citizen of the United States, residing at Cleveland, county of Cuyahoga, State of Ohio, have invented certain new and useful Improvements in Mountings for Control-Buttons, of which the following is a specification.

My invention relates to a means for mounting a control button on a motor vehicle for convenient access to the operator.

In motor vehicles the operator usually has both hands occupied on the steering wheel and both feet disposed so as to work the different brake and power pedals and in order, occasionally, to inaugurate the actuation of some other device, such for instance as the signaling horn, it is necessary to remove a hand from the steering wheel frequently at a time when both hands are needed to control the steering and speed mechanism.

Accordingly, one of the objects of the invention is to provide an electric button or similar inaugurating means which is so mounted relative to the operator's seat that it may be conveniently actuated by a movement of the operator's knee without disturbing the disposition of his hands or feet on the different control mechanism.

Various other objects and advantages of the invention will be in part obvious from an inspection of the accompanying drawings and in part will be more fully set forth in the following particular description of one form of mechanism embodying the invention, and the invention further consists in certain new and novel features of construction and combination of parts hereinafter set forth and claimed.

Figure 1:
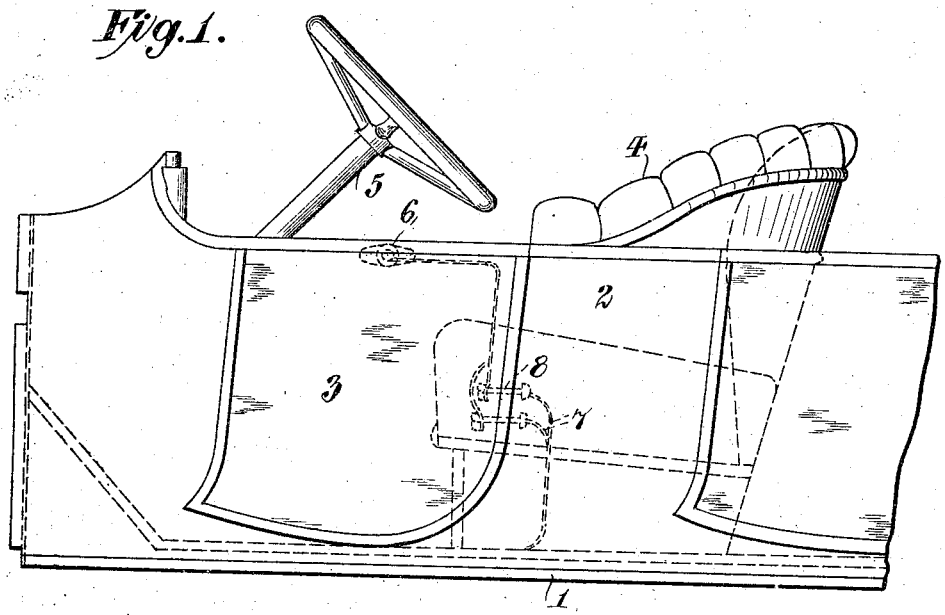
Figure 2:
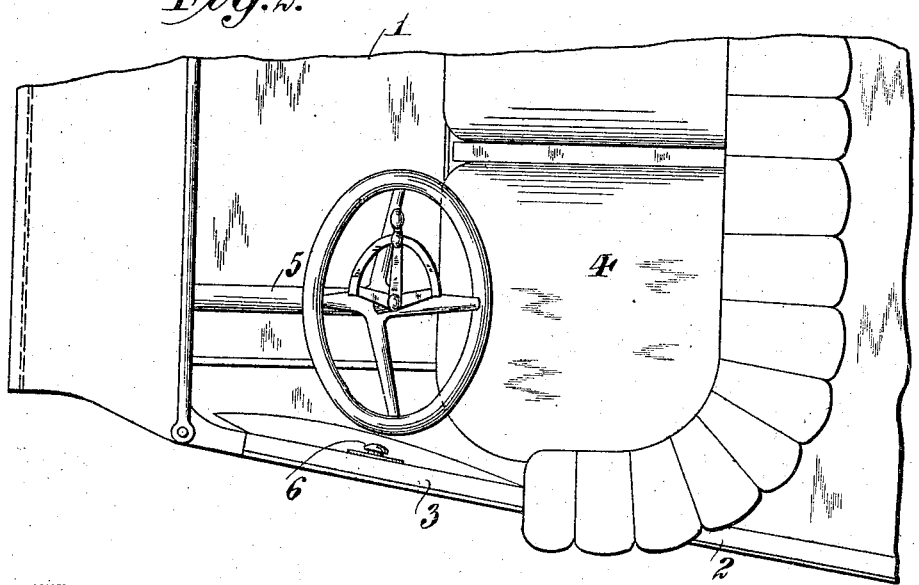

Referring to the accompanying drawings:

Figure 1 is a side elevation of a portion of an automobile showing in dotted lines a preferred embodiment of my invention installed therein; and Fig. 2 is a plan view looking down on a portion of the device shown in Fig. 1.

There is shown a portion of a vehicle body 1 having a side wall 2 including a side door 3 within which body is a seat 4 in juxtaposition to a steering column 5 as is usual with devices of this character.

A button 6 is mounted upon the door 3 and is normally maintained in position projecting into the interior of the body as is usual with electric push-buttons. The position of this button is so disposed relative to the seat that it may be readily engaged by the side of the knee of a person sitting in the seat and has a knee engaging area sufficient to permit a free movement of the foot in different positions while operating the pedals.

Suitable electric wires 7, pneumatic tubing or the like, extend from the button to the signaling horn or other device (not shown) the actuation of which is inaugurated by the pressing of the button.

Where the button is mounted on a swinging door and electric wires are used, the wires are interrupted at the hinged edge of the door and a bridging connection 8 of some suitable form is interposed in the circuit at this point so that the closing of the door will complete the circuit across the door joint and will conceal all parts except the button.

The operator while occupying the seat 4 can keep both hands on the steering column and his feet on or near the pedals. Should it be desired to sound the horn it is merely necessary to move the knee into engagement with the button 6 and hold it there as long as a signaling sound is desired. Releasing the pressure on the button will permit it to return automatically to its normal position.

By means of this arrangement the controls for the several manually controlled elements of the automobile are not affected whenever it becomes necessary to sound the signaling or similar devices and at the same time a conveniently operated means is provided for sounding the horn.

While I have shown and described, and have pointed out in the annexed claim, certain novel features of my invention, it will understood that various omissions, substitutions and changes in the form and details of the device illustrated and in its operation may be made by those skilled in the art without departing from the spirit of the invention.

Having thus described my invention, what I claim as new and desire to protect by United States Letters Patent is:

In a motor vehicle, the combination with a vehicle body having a seat therein, and including a side wall, a steering mechanism positioned in advance of said seat, said wall including a swinging side door hinged along one side and disposed in juxtaposition to said seat and extending forwardly of the seat and to one side of said steering wheel, an electric circuit including a push button mounted on the inner side of said swinging door and provided with a relatively large bearing surface positioned to be engaged conveniently by the knee of the person occupying said seat in rear of the steering mechanism, an electric conductor having a portion concealed within the outlines of the vehicle body and another portion concealed within the outlines of the door and connected electrically to said push button, and a bridging connection at the door joint for connecting the two portions of the conductors across the joint when the door is in closed position, whereby all parts of the operative electric circuit will be concealed when the door is closed.

This specification signed and witnessed this 11th day of April, A. D., 1914.

JOHN V. WHITBECK.

Signed in the presence of—
C. A. CAREY,
C. N. MITCHELL.

Copies of this patent may be obtained for five cents each, by addressing the "Commissioner of Patents, Washington, D. C."